G. DORFFEL.
VEHICLE WHEEL.
APPLICATION FILED OCT. 28, 1908.
967,740.
Patented Aug. 16, 1910.
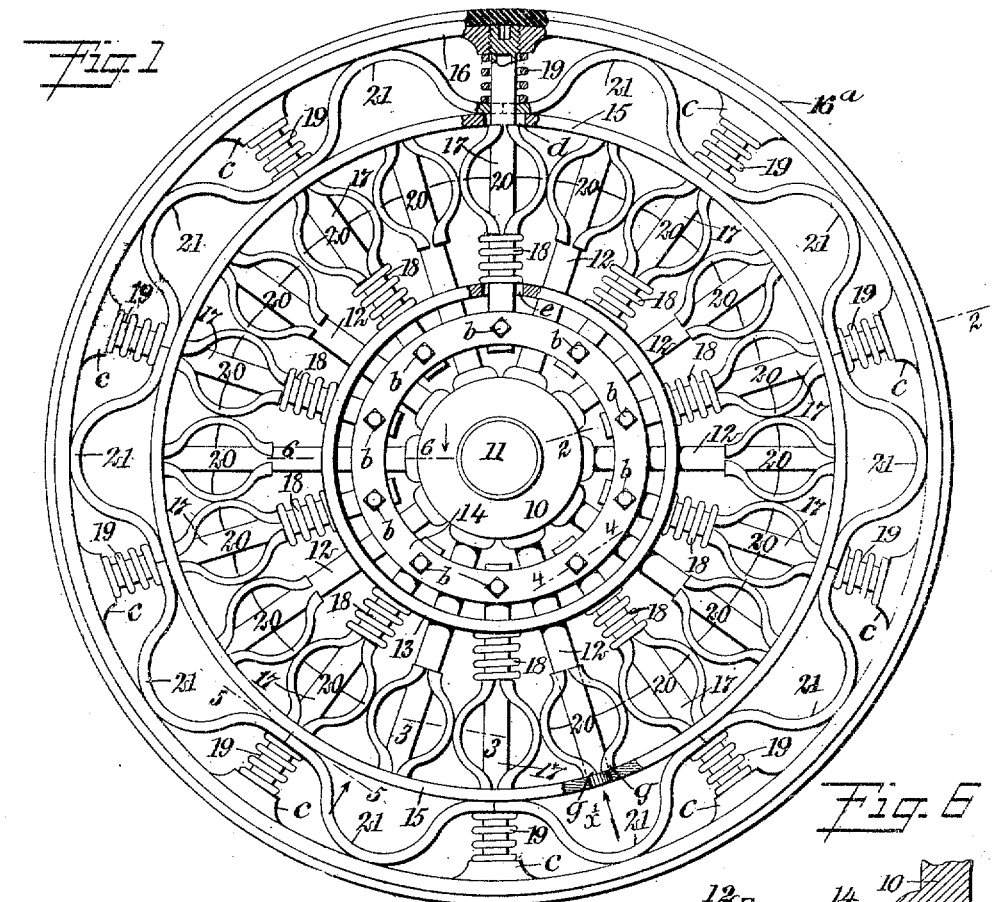
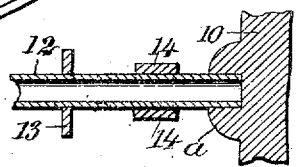
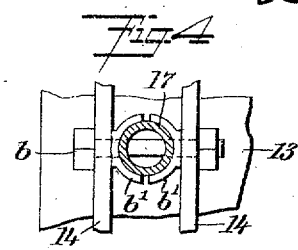
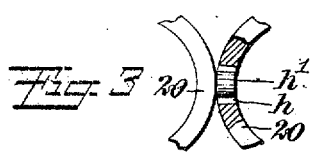
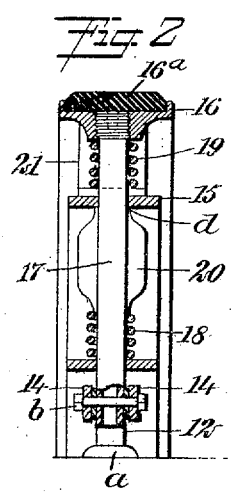
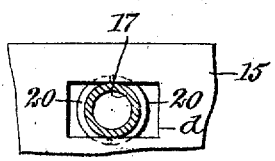
WITNESSES
E. G. Bromley
Wm. T. Patton
INVENTOR
George Dorffel
BY Munn & Co.
ATTORNEYS

UNITED STATES PATENT OFFICE.

GEORGE DORFFEL, OF FRUITVALE, CALIFORNIA.

VEHICLE-WHEEL.

967,740.  Specification of Letters Patent.  Patented Aug. 16, 1910.

Application filed October 28, 1908. Serial No. 459,886.

*To all whom it may concern:*

Be it known that I, GEORGE DORFFEL, a citizen of the United States, and a resident of Fruitvale, in the county of Alameda and State of California, have invented a new and Improved Vehicle-Wheel, of which the following is a full, clear, and exact description.

This invention relates to a class of vehicle wheels which are mainly constructed of metal, so disposed that the rim of the wheel will have sufficient elasticity to absorb shocks due to traverse on a rough road bed; and has for its object, to provide novel details of construction for a vehicle wheel of the class indicated, which afford a strong, light, durable and practical wheel, and which may be employed for vehicles of heavy or light character.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a front view, partly in section, showing the improved wheel mounted upon an axle; Fig. 2 is a transverse sectional view of a portion of the improved wheel, taken substantially on the line 2—2 in Fig. 1; Fig. 3 is an enlarged fragmentary side view of details partly in section, the location of which is indicated by the line 3—3 in Fig. 1; Fig. 4 is an enlarged transverse sectional detail view, substantially on the line 4—4 in Fig. 1; Fig. 5 is an enlarged transverse sectional view, substantially on the line 5—5 in Fig. 1; and Fig. 6 is an enlarged transverse sectional view, substantially on the line 6—6 in Fig. 1.

In carrying into effect the features of my invention as illustrated in the drawings, 10 indicates a central hub for the improved vehicle wheel. The hub 10 is cylindrical, having a central bore for the reception of an axle 11, and is preferably formed with a plurality of bosses *a*, that project from the periphery of the hub at spaced intervals. The bosses *a* are centrally bored, producing a socket in each one, and into said sockets one end of a radial tubular spoke 12 is forcibly inserted. Any preferred number of the bosses *a* and spokes 12 may be provided; as shown, ten of said spokes are radially projected from the hub 10.

A metal ring 13, having greater width than thickness, is a detail of the improvement, said ring having a series of spaced perforations therein, equal with the number of tubular spokes 12, and said spokes are inserted through the ring 13 before they are driven into the hub 10, thus disposing the ring concentric with the axis of the bore in the hub 10, and suitably spaced therefrom. Upon opposite sides of the spokes 12, two plate metal rings 14 are clamped upon said spokes 12 by means of bolts *b*, that are each inserted through alined perforations in the rings and through intermediate spokes, as hereinafter described, and it will be noted that the diameter of the flat rings 14 is such, that they are disposed nearly central between the ring 13 and hub 10.

A co-acting ring 15 is employed, having a series of spaced perforations therein, that receive the outer ends of the stationary spokes 12, said ring being disposed concentric with the hub 10 and ring 13.

The metal tire rim 16 for the improved wheel is continuous, having proper width and thickness, and in its outer surface a channel is formed, wherein a rubber tire 16ª, in flat ring form, is embedded as a completing detail for the wheel.

Preferably the thin rim 16 is formed with a number of bosses *c* projected on the inner surface thereof, said evenly spaced bosses each having a perforation formed therein, that is threaded in its defining wall.

A number of tubular spokes 17, having a like diameter and an equal number with the spokes 12, have one end of each exteriorly threaded for insertion into the rim 16, before the tire 16ª is placed thereon.

Centrally between each spoke 12, where they are inserted through the resilient ring 15, slightly elongated perforations *d* are formed in said ring, as shown for one perforation in Figs. 1 and 5, and in the inner ring 13, centrally between adjacent spokes 12, similar oblong openings *e* are formed, as appears at a sectional portion of Fig. 1.

The end portion of each spoke 17, where the thread is formed thereon, is preferably made solid, said solid portion having a socket therein for the reception of a suitable wrench.

In the construction of the improved wheel, the spokes 12 are inserted into the sockets in the hub 10, first passing through the ring 13, then the spokes 17 are passed through the rings 13 and 15, alternately with the spokes 12, said spokes 17 then having their outer threaded ends screwed into the inner ends of the bosses c.

Referring to the flat rings 14, before mentioned, said rings are clamped upon the inner end portions of the spokes 17 by bolts b, and nuts thereon, said bolts each passing centrally through the clamps and the respective spokes specified.

It will be noted in Fig. 4 that concave clamping jaws b' are formed or secured on the inner sides of the clamping rings 14; said jaws embracing the spokes 17, distribute their pressure over the surfaces of the engaged spokes, so that the latter are not crushed when the nuts on the bolts b are adjusted so as to bind the rings 14 on the spokes that are engaged by said bolts.

Before placing the spokes 17 in position, two coiled springs 18, 19 are mounted upon each one, the coiled springs 18 being seated upon the smaller resilient ring 13.

A series of semi-elliptical springs 20 occupy the spaces between the spokes 12 and 17, and, as shown, two of said springs have contact at their ends upon opposite sides of each spoke mentioned.

To adapt the end portions g of the springs 20 for proper engagement with the tubular spokes 12 and 17, said ends on each pair of springs are concaved in their sides that engage a respective spoke, and are thus adapted to closely embrace the same, as is indicated opposite the arrow x' in Fig. 1.

The convex surfaces of the similar springs 20 have contact at their centers of length, and as shown for one pair of said springs in Fig. 3 an elongated slot or opening h is formed in one spring at its center, and a dowel pin h' is projected from the similar spring that has contact with the one having the slot therein, the pin passing through the slot being permitted to play lengthwise thereof, but is loosely embraced between the parallel side walls defining the width of said slot, this provision permitting the springs to have resilient coöperative action, and at the same time affording lateral support thereto at their impinging centers.

It will be noted in Figs. 1 and 2 that the coiled springs 18 that seat upon the smaller ring 13 are under sufficient compression for a forcible engagement with the corresponding ends of the semi-elliptical springs 20, which are thus impinged upon the inner surface of the ring 15, and it is to be understood that the springs 20 that embrace each detachable spoke 12 are retained in operative position by their pin and slot connections with adjacent springs 20 on the spokes 17.

Between the larger ring 15 and the wheel rim 16, the coiled springs 19 are positioned on the spokes 17, and in the space between each pair of said spokes that are adjacent to each other, a semi-elliptical spring 21 is introduced.

The ends of the springs 21 are concaved so as to embrace the body of a respective spoke 17, and the convexed surface of each spring at its center has impingement upon the inner surface of the rim 16, and said springs are placed under tension to insure solidity of the wheel as an entirety. The ends of the springs 21 that embrace a spoke 17 are seated upon the outer surface of the ring 15, and the springs 19 each seat upon a pair of said ends of the springs 21.

To complete the construction of the wheel, the elastic tire 16ᵃ is mounted upon the rim 16, within the recess in the latter, and due to its constriction thereon is retained in place, the slight roughness on the ends of the spokes 17 serving to prevent the tire from slipping around on its seat.

It is of advantage to lubricate such parts of the resilient wheel as have a slidable engagement with each other, and it will be noted that the stationary spokes 12 stiffen the working details of the wheel against lateral displacement, while the rings, semi-elliptical springs and spiral springs, coöperate with the spokes 17 for the proper distribution of load strain, and render the vehicle wheel resilient in every direction under all conditions of service.

The generic features of the invention adapt it to receive such a relative proportion of parts, as will enable the construction of heavy, strong wheels capable of service as a part of the running gears for an automobile, or be built very light for other types of road vehicles drawn by horses, and be equally serviceable in either application of the invention.

Having thus described my invention, I claim as new and desire to secure by Letters Patent:

1. A vehicle wheel embodying a hub, spaced spokes, fixed on and radiating from the hub, clamping rings loosely secured oppositely on said stationary spokes, a ring concentric with the hub and through which the stationary spokes are passed outward, a rim, spokes extended inward from the rim between the stationary spokes and fixedly secured to the clamping rings, another ring through which the spokes carried by the rim project, and springs carried by said spokes.

2. A vehicle wheel, embodying a hub, a plurality of spokes fixed in and radiating from the hub, said spokes being evenly spaced apart, a ring through which the stationary spokes are passed outwardly, a rim having a channeled periphery, spokes carried by the rim and projected inwardly between and evenly spaced from the stationary spokes, two clamping rings bolted oppositely on the inwardly projected spokes, coiled springs mounted upon the spokes carried by the rim, a plurality of springs in pairs embracing with their ends all the spokes, said springs at their centers having pin and slot connections in pairs, a second ring through which the spokes carried by the rim pass, semi-elliptical springs disposed between the rim and said ring, the ends of said springs impinging upon the inwardly-extended spokes, coiled springs on said spokes pressing between the meeting ends of the semi-elliptical springs and the rim, and an elastic tire ring mounted in the channel in the rim.

3. In a metal vehicle wheel of the character described, the plurality of semi-elliptical springs, having their ends concaved at adjacent sides, and their convex surfaces that meet at their centers connected together by a slot in one spring and a dowel pin projected from the impinging spring.

4. In a wheel of the class described, a central hub, spokes radiating from the hub, a rim concentric with the hub, spokes connected to the rim and converging toward the hub, rings arranged intermediate the rim and the hub and spaced apart from each other, the spokes connected to the rim passing through both rings, and the spokes connected to the hub passing through the inner ring and engaging the outer ring, semi-elliptical springs between the spokes, a coil spring at each end of the spokes connected with the rim, the outer spring being arranged between the rim and the outer ring, and the inner spring being arranged between the inner ring and the adjacent ends of the semi-elliptical springs, the outer ends of said springs engaging the outer ring.

In testimony whereof I have signed my name to this specification in the presence of two subscribing witnesses.

GEORGE DORFFEL.

Witnesses:
 EDWARD M. SHAW,
 C. E. BROWN.